Dec. 11, 1962
D. P. WELLES, JR
3,067,509
HOLE DIAMETER REDUCING TOOL
Filed Nov. 23, 1959
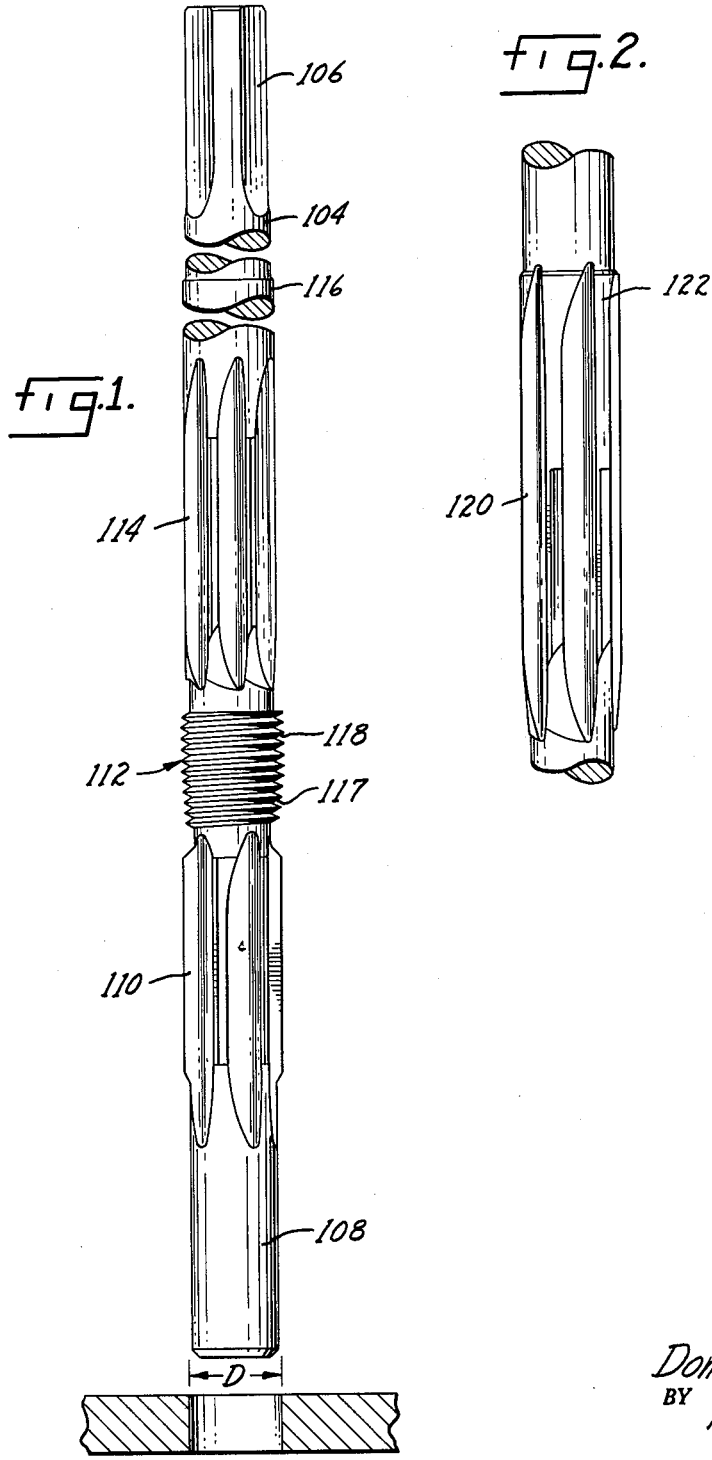
INVENTOR.
Donald P. Welles Jr.,
BY Parker & Carter
Attorneys.

united States Patent Office 3,067,509
Patented Dec. 11, 1962

3,067,509
HOLE DIAMETER REDUCING TOOL
Donald P. Welles, Jr., Rockford, Ill., assignor to Besly-Welles Corporation, South Beloit, Ill., a corporation of Illinois
Filed Nov. 23, 1959, Ser. No. 854,907
9 Claims. (Cl. 29—567)

This invention is in the field of tools for reducing the size of a hole in a workpiece, for example, a worn valve guide or the like, and is more specifically concerned with a tool that is intended to pass through the work.

A primary object of the invention is a tool for reducing the size of a cylindrical hole in a through operation which will be properly supported during all phases of its movement.

Another object is a combination tool which will not chatter when the forward end is unsupported.

Another object is a combination tool which has a following pilot to hold its finishing reamer on diameter.

Another object is a combination reamer and threader type tool which is constructed to pass all the way through the workpiece without chattering.

Other objects will appear from time to time in the ensuing specification and drawings in which:

FIGURE 1 is a side view of the hole reducing tool; and
FIGURE 2 is a partial side view of a modified form.

As shown, the tool has a shaft 104 flattened as by milling or otherwise at one end, as at 106, with various working portions at or toward the other end. Taking the various sections in order, starting from the front end, the tool first has a leading pilot 108 followed by a leading or sizing reamer 110. Next is a threaded or metal working section 112 which is followed by a finishing reamer 114. And last is a following or stabilizing pilot 116.

The threaded section 112 is primarily the metal working section and may be, in detail, of the type shown in copending application Serial No. 827,942, filed July 17, 1959. This is to say that the threads have a tapered leading portion 117 on the forward portion thereof next to the leading reamer 110 followed by a metal working or sizing section 118. As the threads go up the tapered section and merge into the threads on the sizing section, the root areas of the threads enlarge to accept the inward flow of metal and the crest areas are formed to force the metal radially inwardly. Assume, for example, the tool is to be used on a workpiece having a hole in it with a diameter D, as shown, the constant diameter threads in section 118 would have a pitch diameter related to the initial diameter D of the hole. The threads in the tapered section will taper down to a point such that the crest diameter of at least one or several turns at the front end will be less than the initial hole diameter D.

The leading or sizing reamer 110 is positioned ahead of the threaded section and is an integral part of the tool. The diameter of the reamer 110 should be less than the crest diameter of the threaded section and possibly something on the order of the pitch diameter, more or less. The object of the leading reamer is to bring the hole to the proper diameter for the threaded section to work with. In the event that the hole is undersize for the metal working threads 112, the sizing reamer will bring the hole to proper size, and the threaded section would not bind. In essence, the leading reamer 110 will ream the hole out to the proper size, and quite accurate at that, for the threads to work with.

The finishing reamer 114 may have a diameter anywhere between the crest and root diameters of the threaded section 112, and its diameter is the desired final hole diameter. Thus, when the material has been worked inwardly by the threaded section 112, the finishing reamer will remove the excess material and will bring the hole to the desired diameter.

A tool of this type may be driven by a flexible drive, such as a Bowden wire or the like, and it quite often happens that misalignment will occur. A tool of this type is intended to pass all the way through the work and is not an in and out tool. When the tool is initially introduced into the hole, only the reamer 110 would make contact, and since the tool is being somewhat flexibly or loosely driven and the rear end 106 might wobble around, the leading reamer 110 could chatter or skew and cut or gouge the hole outside of the desired diameter for the threaded section 112 to handle. To prevent this I position a pilot 108 ahead of the leading reamer which is of a diameter to be freely inserted in the hole with a smooth close fit and sufficiently long axially to provide a rigid support to guide the leading reamer and hold it on the proper diameter. Since the leading reamer 110 is of a diameter to bring an undersized hole to a diameter that the threaded section 112 is designed to handle, the pilot 108 in all cases will be less in diameter than the pitch diameter of the sizing section 118. Since the tool is intended to reduce the diameter or effective diameter of the hole to the diameter of the finishing reamer 114, the hole in all probability will be greater than the diameter of the finishing reamer. Therefore, the pilot 108 should be no greater than the diameter of the finishing reamer so that in all cases it will fit the hole.

After the threads 112 have passed through the hole, the leading pilot 108, the leading reamer 110, and the threaded section 112 may be sticking out the other side, while the finishing reamer 114 is finishing out the rear end of the hole to the proper diameter. The tool will have its forward section totally unsupported, which is to say that from the threads forward the tool will be unsupported. Since it may be rotated at a relatively fast rate, the forward unsupported end may have a tendency to wobble around, causing the finishing reamer 114 to skew or bind in the hole resulting in chattering and an oversize hole or pit marks and gouging.

To prevent this, the following pilot 116 provides a snug fit with the finished hole and should be of a diameter close to the diameter of the finishing reamer. No particular effort is made to bring the diameter significantly below the finishing reamer diameter. Thus, when the forward end of the tool, including the forward pilot, the leading reamer, and the threaded section, is projecting beyond the other side of the workpiece, and is totally unsupported, the rear or following pilot will provide an axial rigidity due to its snug fit with the newly formed hole diameter and will allow the finishing reamer 114 to finish the last part of the hole without chattering.

In FIGURE 2 I have shown a modified form in which the flutes 120 of the finishing or sizing reamer extend all the way through the rear or stabilizing pilot 122. In the event that chips formed by the finishing reamer 114 might bind between the stabilizing pilot 116 and the hole surface, extending the reamer flutes all the way through, the stabilizing pilot will provide a passage for the chips to clear. The edges of the flutes in the pilot, however, are not relieved in the standard manner of reamer flutes and, accordingly, the pilot will not cut the surface of the hole. It will be noted in FIGURE 1 that the reamer flutes extend somewhat into the stabilizing pilot, but the extent of the relieved reamer flutes is clearly indicated in both cases.

The use, operation and function of the invention are as follows:

A fundamental object of the leading pilot is to prevent the sizing reamer 110 from chattering when the rest of the tool is unsupported. This is not as important as the finishing reamer. The tool will project beyond the other side of the workpiece with a substantial overhang which, unless it is either supported or the tool is stiffened, will wobble around causing the finishing reamer to chatter. In effect, the stabilizing pilot will hold the finishing reamer on its intended diameter and will provide longitudinal stability and axial stiffness. This insures that the reamer cutting edges will stay on the proper diameter and will not cut too deep or chatter.

It should be understood that when the rest of the tool has passed through the back side of the workpiece and only the finishing reamer 114 and the stabilizing pilot 116 are still in the workpiece, if the pilot were not present the tool would only be supported by the line edge contact of some six or eight reamer flutes, each of which is specifically designed to provide a minimum of contact area with the hole to reduce torque and effect cutting. Thus, the tool would be virtually unsupported.

But the stabilizing pilot prevents this and, in effect, ties the reamer to a solid supported foundation which will hold it true on center and the forward unsupported end of the tool, even though it may wobble somewhat, will nevertheless have its wobble reduced and will not affect the operation of the finishing reamer.

Whereas the preferred form and one variation of the invention have been shown and described, it should be understood that suitable additional modifications, changes, substitutions and alterations may be made without departing from the invention's fundamental theme. It is, therefore, wished that the invention be unrestricted, except as by the appended claims.

I claim:

1. A tool for reducing the size of a hole in a metal workpiece, including a shank with a threaded body section for working the metal inwardly in the hole, a finishing reamer section behind the body section axially aligned with it and having a diameter between the crest and root diameters of the body section and less than the original diameter of said hole, and a pilot behind and directly next to the finishing reamer section axially aligned with it, and having a diameter no greater than the diameter of the finishing reamer section.

2. The structure of claim 1 further characterized by and including a leading reamer section ahead of the threaded body section having a diameter between the pitch and crest diameters of the body section.

3. A tool for reducing the diameter of a hole in a metal workpiece including a shank, said shank having a threaded body section, said threaded body section including thread means having a crest diameter greater than the original diameter of said hole and a root diameter less than the original diameter of said hole such that the metal is worked inwardly in said hole upon the passage of said threaded means therethrough, a finishing reamer section axially aligned with said body section and having a diameter less than said original diameter and greater than said root diameter and a pilot axially aligned with, behind and directly adjacent said finishing reamer, said pilot having a diameter substantially equal to the diameter of the finishing reamer section.

4. The tool of claim 3 further characterized by and including a leading reamer section ahead of said threaded body section having a diameter between the pitch and crest diameters of said thread means.

5. A tool for reducing the diameter of a cylindrical hole in a metal workpiece including a shank, said shank having a threaded body section, said threaded body section including thread means having a crest diameter greater than the original diameter of said hole and a root diameter less than the original diameter of said hole such that the metal is worked inwardly in said hole upon the passage of said threaded means therethrough, a finishing reamer section axially aligned with said body section and having a diameter less than said original diameter and greater than said root diameter, a pilot axially aligned with, behind and directly adjacent said finishing reamer, said pilot having a diameter substantially equal to the diameter of the finishing reamer section, a leading reamer section ahead of said body section having a diameter between the pitch and crest diameters of said thread means and a pilot axially aligned with the leading reamer section and disposed ahead of and directly adjacent it and having a diameter no greater than the diameter of the finishing reamer section.

6. A tool for reducing the diameter of a cylindrical hole in a metal workpiece including a shank, said shank having a threaded body section, said body section including thread means having a crest diameter greater than the original diameter of said hole and a root diameter less than the original diameter of said hole such that the metal is worked inwardly in said hole upon the passage of said threaded means therethrough, a finishing reamer section axially aligned with said body section and having a diameter less than said original diameter and greater than said root diameter, a pilot axially aligned with, behind and directly adjacent said finishing reamer, said pilot having a diameter substantially equal to the diameter of said finishing reamer section and a pilot ahead of said threaded body section and axially aligned therewith and having a diameter no greater than the diameter of said finishing reamer section.

7. A tool for reducing the diameter of a hole in a metal workpiece including a shank, said shank having a threaded body section, said threaded body section including thread means having a crest diameter greater than the original diameter of said hole and a root diameter less than the original diameter of said hole such that the metal is worked inwardly in said hole upon the passage of said thread means therethrough, a finishing reamer section comprising flute means extending axially of said body section and having an outside diameter less than said original diameter and greater than said root diameter and a pilot axially aligned with, behind and directly adjacent said finishing reamer, said pilot having a diameter substantially equal to the diameter of said finishing reamer section.

8. The tool of claim 7 further characterized in that said flute means extend substantially all the way through said pilot to provide for metal chip clearance.

9. The tool of claim 7 further characterized in that said flutes extend partially into said pilot.

References Cited in the file of this patent

UNITED STATES PATENTS

| | | |
|---|---|---|
| 832,076 | Oster | Oct. 2, 1906 |
| 1,475,561 | Bath | Nov. 27, 1923 |
| 2,284,522 | Keen | May 26, 1942 |
| 2,548,702 | Chamberlain | Apr. 10, 1951 |
| 2,807,813 | Welles | Oct. 1, 1957 |

FOREIGN PATENTS

| | | |
|---|---|---|
| 629,458 | Great Britain | Sept. 20, 1949 |